United States Patent [19]

Clifton

[11] Patent Number: 4,469,294

[45] Date of Patent: Sep. 4, 1984

[54] V/STOL AIRCRAFT

[76] Inventor: Robert T. Clifton, 7999 Hansen, #420, Houston, Tex. 77061

[21] Appl. No.: 380,480

[22] Filed: May 20, 1982

[51] Int. Cl.³ .............................................. B64C 27/22
[52] U.S. Cl. ....................................... 244/12.3; 244/8; 244/10; 244/21; 244/23 B; 244/60; 244/45 A
[58] Field of Search .................. 244/12.1, 12.3, 6.7 A, 244/8, 10, 21, 23 B, 60, 45

[56] References Cited

U.S. PATENT DOCUMENTS

| | | | |
|---|---|---|---|
| 1,130,623 | 3/1915 | Mustonen | 244/6 |
| 1,276,778 | 8/1918 | Loveczky | 244/60 |
| 3,065,928 | 11/1962 | Dornier | 244/12.1 |
| 3,083,935 | 4/1963 | Piasecki | 244/12.3 |
| 4,030,688 | 6/1977 | Pellarini | 244/45 A |
| 4,125,232 | 11/1978 | Maclean et al. | 244/12.3 |

*Primary Examiner*—Trygve M. Blix
*Assistant Examiner*—Ivy M. Shum

*Attorney, Agent, or Firm*—Dula, Shields & Egbert

[57] ABSTRACT

A V/STOL aircraft comprising a fuselage, having three sets of wings that are offset lengthwise and vertically. The center set of relatively small relatively thick wings 34 between the canard 14 and the rear relatively thin relatively large aerodynamic lift wings 18 are equipped with identical lift fans 36 enclosed in the wing by upper and lower movable slotted deflectors 40. The attitude of the slatted deflectors may be varied to transition the present invention from hovering to forward flight, and vice versa. The present invention's lift fans are interconnected by a balanced power distribution system, to insure constant, efficient use of total power and provide symmetrical lift about the aircraft's center of gravity resistibility. In the event of an engine failure, the remaining lift is still properly distributed to maintain symmetrical lift, so as to maintain balance and operational control of the aircraft in the lift mode.

1 Claim, 8 Drawing Figures

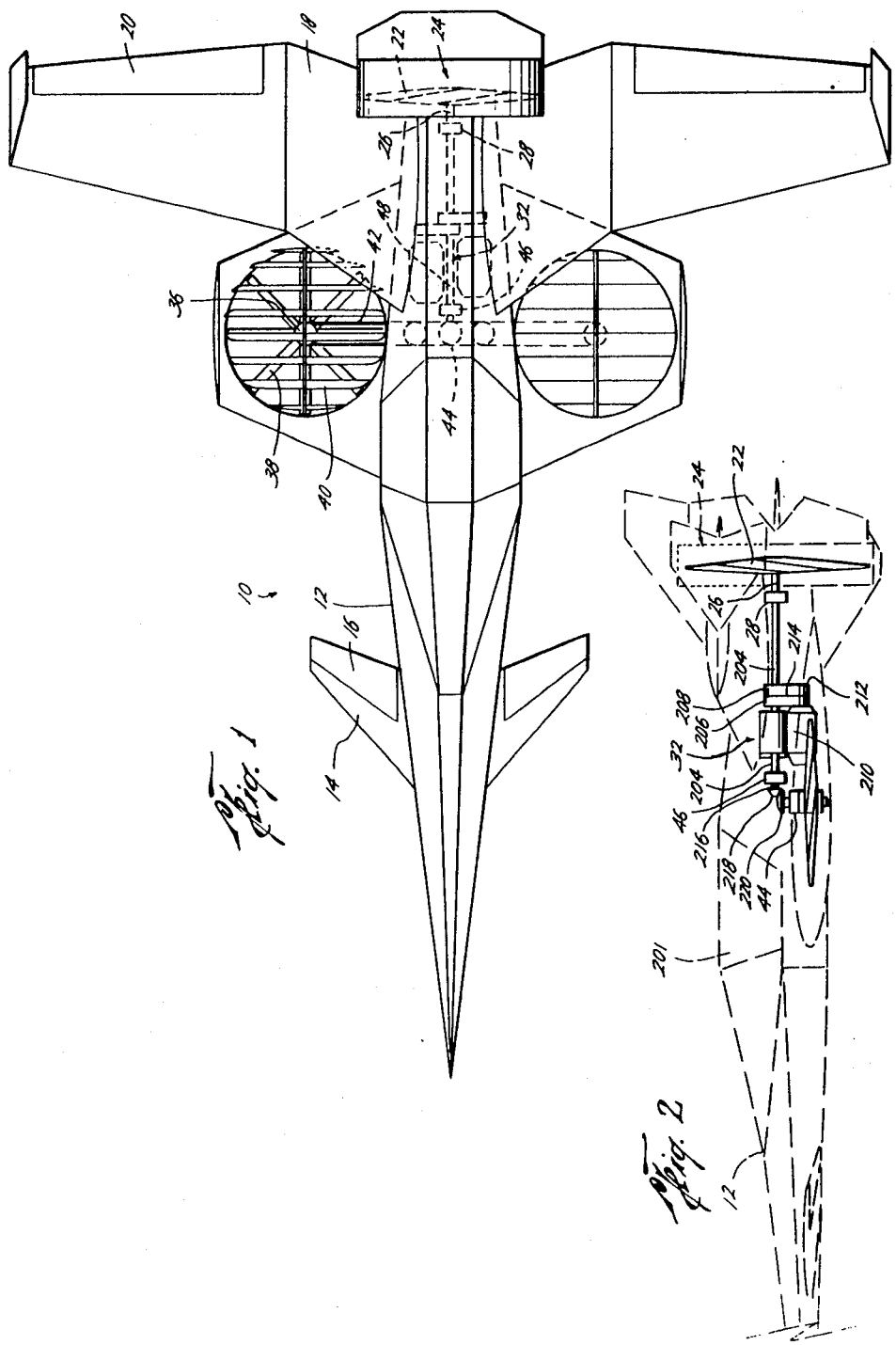

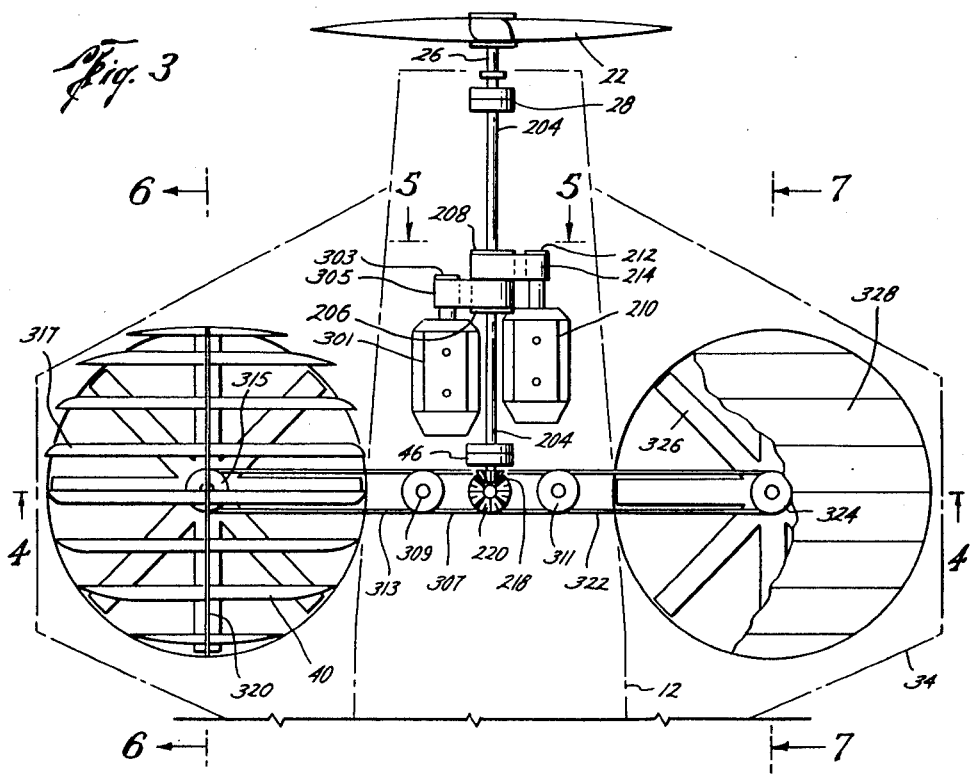
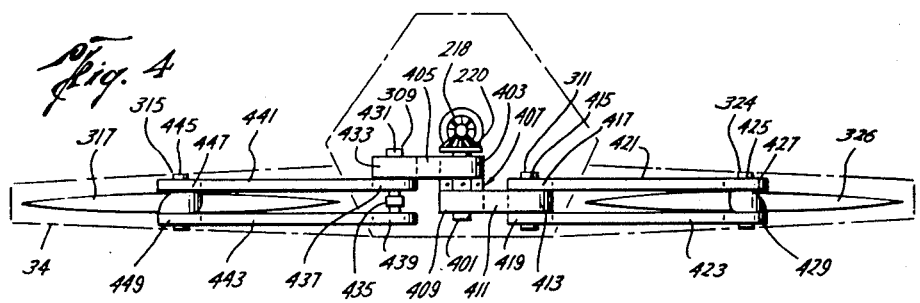
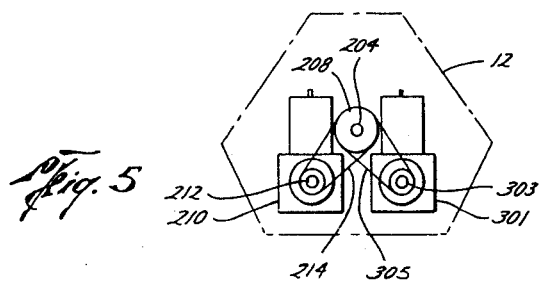

V/STOL AIRCRAFT

TECHNICAL FIELD

The present invention relates to vertical and short take-off and landing aircraft (V/STOL) and more specifically relates to V/STOL aircraft wherein ducted fans located in one set of the aircraft's wings are provided with controllable slotted housings whereby air movements from the fans may be directed for control of the aircraft while in hovering mode or transition mode between hovering and forward flight; in the wing's housing, the lift fans slotted apparatus when closed become a set of aerodynamic lift wings in forward flight.

BACKGROUND ART

Aircraft are generically divided into two major classes, fixed wing and rotating airfoil. The former are typically thought of as "airplanes", and derive their lift from the forward motion of the machine, which causes air to pass over an airfoil. Rotary winged aircraft, commonly called "helicopters", have a prime mover attached to an airfoil, which rotates. The primary drawback to conventional aircraft is that they must have rather large areas to take off and land. The principal drawback to the helicopter is that it is extremely expensive to manufacture, has little inherent control stability, and is capable of very low forward speeds, compared to an aircraft having a prime mover of the same power. The most successful short take-off and landing aircraft is the helicopter, whose rotary system produces the necessary lift. To reduce high speed vibration and drag of the rotor, stub wings are sometimes added to produce lift at forward speeds, thereby reducing load on the rotor. The results, in various configurations, are called the convertaplane. In hovering, however, the down wash of the rotor produces large loads on the wings, which compromises hovering performance.

To avoid these difficulties, several alternatives have been tried. These range from tilting the entire aircraft ninety degrees (90°) after vertical takeoff, as was done with the "Bell Pogo" aircraft, which used counter-rotating propellers on the nose of the aircraft, to tilting the power plant or wings, in combination. The same effect can be obtained by running jet engines in a horizontal position and deflecting the jet blast downward, to effect vertical thrust for take-off. When sufficient altitude has been gained, the deflection vanes are retracted and the aircraft moves in level flight. The most spectacular example of this class is the British Harrier military aircraft, which can rise vertically from an area little greater than its own overall dimensions, then achieve supersonic speed in level flight. The process can be reversed for vertical landing.

All direct-lift machines known to prior art have certain problems in common. The first is the detrimental effect of the high energy slip stream or jet striking the ground. Loose material thrown about constitutes a hazard, both to the machine and to personnel in the vicinity. Also, while the entire lifting force depends upon the engines while hovering at low speeds, power failure could prove catastrophic. The greatest possible reliability in adequate emergency back-up systems is necessary in order to assure the safety of the machine and its occupants.

Because there is little or no flow over the aerodynamic control surfaces during hovering flight, entirely different types of thrust vector controls have been utilized by V/STOL's during hovering or slow forward flight. As of the early 1980's, none of these systems are entirely satisfactory.

U.S. Pat. No. 3,335,976 shows an aircraft, like the Ryan XV-5A, incorporating lift fans in the large relatively thick main lift wings and using clamshell shutters to close off the lift wing during forward flight. This design requires thick main wings, which create unacceptable drag during forward flight.

U.S. Pat. No. 4,194,708, teaches the use of a deflectable canard/elevator placed close to the nose tip of the aircraft, with wings mounted low and well aft on the fuselage. U.S. Pat. No. 3,618,875 teaches a V/STOL aircraft having tandem wings containing lift fans, wherein the wings provide only drag during forward flight.

The prior art teaches that, in order to maintain sufficient vertical thrust to operate a VTOL, in-the-wing fans have always necessitated the use of aircraft wings of relatively large area. This has led to the development of many designs such as that shown in U.S. Pat. No. 3,388,878, wherein fuselage mounted lift fans and gas generators lead to very complex retractable lift fan installations. It has been the object of much of the prior art of wing-mounted lift fans to minimize wing area, wing weight and general complexity, because the wings containing the lift fan were not used to provide aerodynamic lift during forward flight. For these reasons full potential of lift fans concept has not been fully realized in V/STOL aircraft designs proposed to date.

U.S. Pat. No. 3,614,030 teaches a disk-like aircraft body forming an axis of revolution, wherein individually controlled rotary members movable about the air flow axis control the direction of discharge of air from the ducts. U.S. Pat. No. 3,614,030, however, does not teach an aircraft using conventional aerodynamics lift, but, rather, a ground effect machine.

Generally speaking, these, and other prior art proposals have sought to produce V/STOL aircraft capable of obtaining the vertical flight characteristics of helicopters and the forward flight characteristics of fixed wing aircraft. Such a hybrid provides a potential solution to the air traffic problems of congestion, both in conventional airports and in land transportation to and from conventional airports. The much lower approach speeds of V/STOL aircraft can permit many more aircraft to safely occupy the air space for multiple take-offs and landings.

Previously proposed fixed wing V/STOL aircraft have encountered many problems in assuring safe and reliable operation. From a practical standpoint, prior fixed wing V/STOL aircraft have also had such a high direct operating cost that they are commercially unattractive.

DISCLOSURE OF THE INVENTION

The present invention is a V/STOL aircraft having a plurality of tandem wings which are offset lengthwise and vertically. At least one relatively small but relatively thick set of wings contains a matched pair of lift fans selectively driven by the prime movers that drive the primary rotating pusher airfoil of the present invention. The lift fan wing is provided with upper and lower controllable louvers whereby the flow of air through the lift fans may be controlled in both inlet and outlet, during vertical takeoff and landing, and during transition to and from forward flight.

The present invention is equipped with a simple power distribution system and dual prime movers, whereby the failure of an engine will not prevent the aircraft from maintaining balance and control of operation in the lift mode.

The lift fan louvers of the present invention are fluted and controllable, such that they cause the lift fan wing to become an airfoil wing during forward flight. The main lift wings of the present invention are relatively thin, to lower drag, but relatively large compared to the lift fan wings.

Other and further characteristics of the present invention may be understood by reading the best mode for carrying out the invention and the claims.

BRIEF DESCRIPTION OF THE DRAWINGS

FIG. 1 is a partially cut-away top view of an aircraft constructed according to the preferred embodiment of the present invention.

FIG. 2 is a partially cut-away side view illustrating the arrangement of the prime mover, lift fans and pusher propeller of a preferred embodiment of the present invention.

FIG. 3 is an interior mechanical view of the power plant of the present invention, shown located in the empennage of the present invention.

FIG. 4 is a cross-sectional view taken along lines 4—4 at FIG. 3, showing the power transmission arrangements for the lift fans of the present invention.

FIG. 5 is a view taken along Section 5—5 of FIG. 3, showing the belt drive arrangement for the dual prime movers of the present invention.

BEST MODE FOR CARRYING OUT THE INVENTION

Figure 6:
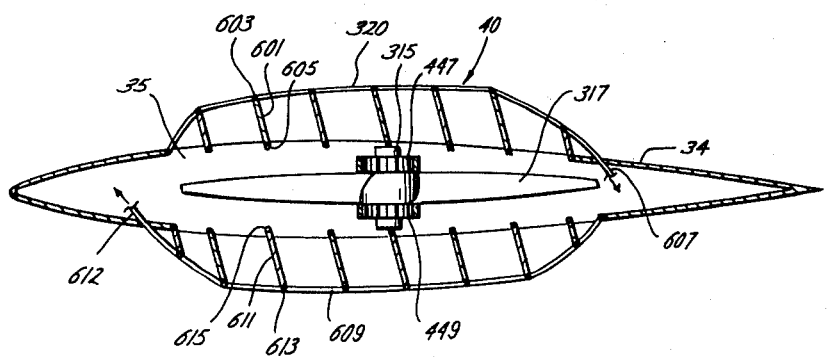
FIG. 6 is a cross-section of the lift wing of the present invention taken along line 6—6 of FIG. 3 and showing the geometry of the louvers of the lift wing of the present invention as they are open during operation of the lift fan.

FIG. 1 shows aircraft 10 having a fuselage 12 which is assembled from flat sheets of light but strong material, such as a rigid foam sandwich of epoxy, graphite fabric or Kevlar. Fuselage 12 has a forward decalage, comprising a pair of wings in a canard configuration 14. Each wing of decalage 14 has a working surface.

Fuselage 12 also has rear empennage structure 18 comprising a pair of wings having a positive dihedral. Each one of wings 18 has an elevator or aileron 20.

Empennage structure 18 also has a shrouded driving propeller 22 inside propeller shroud 24. A pair of orthogonal working surfaces is provided aft of propeller 22. These working surfaces, i.e., the rudder and auxiliary elevator, which are stationed behind the pusher propeller provide positive directional and attitude control by deflection of air flow from the pusher propeller. The amount of air flow over these surfaces need only be minimal as the propeller will not produce a large amount of thrust during hover mode.

Pusher propeller 22 is connected by shaft 26 to a clutch mechanism 28. Clutch mechanism 28 is connected by a shaft 30 to prime mover assembly 32, which will be discussed in more detail below.

Fuselage 12 is also equipped with an intermediate decalage 34, which comprises a pair of lift fan wings, each containing a lift fan assembly 36. Lift fan assembly 36 includes a multi-bladed lift fan propeller 38 and a controllable slatted upper and lower air movement control means 40.

Medial decalage 34 is located between empennage structure 18 and forward canard decalage 14.

Lift fan assembly 36 is driven by a pair of belts 42, which operably engage power transfer assembly 44, which will be described in greater detail later. Power transfer assembly 44 is connected by lift clutch 46 to shaft 48 of prime movers 32.

The fuselage 12 is made of materials such as foamed core, Kevlar, or graphite cloth, impregnated with epoxy resins. The two engines of prime mover 32 are two stroke engines producing in excess of one horse power per pound of engine weight. One example of such an engine is the Kiwasaki 550 two-cylinder engine. The present invention is not limited to any particular combination of structural materials for the air frame or prime mover for the power plant. However, the inventor believes that the best mode for carrying out the invention would encompass the use of such materials because they are light weight and of high strength and two cycle reciprocating engines for the prime mover because of their high power to weight ratio.

Functionally, FIG. 1 shows a single seat version of the present invention. This particular embodiment is intended to be built and operated for minimum cost, even possibly as a kit.

Fuselage 12 is adequate in diameter for a very reclined seated individual pilot. Forward decalage 14 provides pitch control by means of moving elevators 16. Intermediate decalage 34 provides direct fan lift when louver system 40 is open and aerodynamic lift when louver system 40 is closed and locked, as will be explained in greater detail below.

Clutches 28 and 46 provide for selectable power distribution between pusher prop 22 and lift fans 36. Rear empennage assembly 18, including dihedral wings, provide roll control through use of ailerons 20 and the orthogonal working surface aft of propeller 22. The aileron control system for the present invention can be any system known to the prior art, of which there are many. Such systems include a simple wire and pulley system, such as used on most light aircraft, or the digital fly by wire systems now being developed for advanced aircraft.

The design of such control systems is well known to those skilled in the art of aeronautical engineering.

FIG. 2 is a dotted side view of FIG. 1, showing the power train components of the preferred embodiment of the present invention in greater detail.

Throughout this specification power train components of the present invention, such as support brackets, bearings and other essential, but well known, parts of the present invention have been omitted in order to clearly show the novel structure of the present invention. The additional parts not shown are not required by the present disclosure because their design and placement would be obvious to any mechanical engineer.

For example, the engines obviously must be mounted to the fuselage, but the details of such mounting do not form a material part of the present invention; thus they have been omitted in the interests of clarity. Likewise, the shafts illustrated by the present invention must be supported along their length and at their ends by bearings; these bearings must be, in turn, embedded in bearing supports, which are affixed to the fuselage. All of these details would be obvious to one of ordinary skill in the art of aeronautical engineering.

In FIG. 2, similar numbers indicate similar objects. Fuselage 12 is shown with a transparent canopy 201. After the transparent canopy, prime mover 32 is shown comprising a central shaft 204, which engages lift fan power transfer clutch 46, at its forward end, and engages pusher propeller clutch 28 at its aft end. A pair of power transfer pulleys 206 and 208 are affixed to shaft 204, medial between clutch 46 and clutch 28.

One engine 210, which preferably is a two-cycle gasoline driven engine capable of generating more than one horse power per pound of weight, operably engages a driven pulley 212. A slotted power transfer belt 214 driveably engages both pulley 212 and power transfer pulley 208 affixed to shaft 204. Clutch 28 selectably transfers power to propeller shaft 26, which drives pusher propeller 22 located in fan duct 24.

At the opposite end of shaft 204, clutch 46 selectively engages shaft 216, which drives bevel gear 218. Bevel gear 218 engages its complementary orthogonal bevel gear 220, which, in turn, drives lift wing power transfer and distribution assembly 44.

Functionally, operation of prime mover 210 places an amount of torque, controllable by the pilot through adjustment of the throttle setting, on slotted pulley 212. Pulley 212 drives belt 214, which engages slotted pulley 208, which drives shaft 204. Shaft 204 drives clutch assemblies 28 and 46, which may be simultaneously or individually engaged or disengaged by the pilot. The actuator mechanism for the clutch assemblies and for the throttle have not been shown because they are well known to the art. In the preferred embodiment of the present invention, such actuator may be hydraulic or mechanical. The present inventor believes that the fullest and best use of the present invention will be obtained through the use of digital fly-by wire techniques, using microcomputers. Such techniques, however, have not yet been tested; thus, they are discussed as equivalents of conventional hydraulic or mechanical techniques and are not shown in detail.

Engaging clutch 28 causes power to be transmitted through shaft 26 to drive pusher propeller 22. Pusher propeller 22 is a normal pusher propeller that mobilizes the aircraft of the present invention in its forward flight regime. Conversely, engagement of clutch 46 transfer power through bevel gears 216 and 218 to power distribution and transfer assembly 44, which causes counter-rotation of the lift fans in medial decalage 34 and produces lift directly by mass flow of air through the lift fans. It is important that the present invention can engage either or both of these lift producing means. Coordination of transfer of power from one means to the other is necessary for transitioning the present invention to and from its stationary and forward flight regimes.

Prime mover 210 should be capable of turning in excess of 7,000 r.p.m. and producing in excess of 100 h.p. each. Belts on pulley 212, i.e., belt 214, are uniroyal h.t.d. drive belts. Slotted pulleys 212 and 208 are hard-chromed aluminum sprockets employing one-way sprag bearings, mounted within the sprockets to allow a solid connection between the driving pulley and the drive shaft only in the direction of power rotation. This allows the drive sprocket to freewheel on the shaft and not place a load on the main drive shaft should one of the engines fail. It also allows pusher propeller 22 to free-wheel during the descending glide, so that the two cylinder engines may idle while the prop free-wheels on the descent. Shaft sprocket 208 is approximately six inches (6") in diameter, while engine sprockets 212 are approximately three inches (3") in diameter. The diameter of pulleys 212 and 208 are in a two-to-one ratio, because the two cycle engines used as prime mover in the preferred embodiment of the present invention generally turn at approximately twice the r.p.m. necessary to drive pusher propeller 22. The belt system chosen for the present invention has been found to transmit about 98.5% of power placed on it. Thus, the drive shaft 204 turns approximately 3500 r.p.m. at 200 h.p.

FIG. 3 shows a partially cut away top view of the power train of the present invention illustrated generally in FIG. 2.

In FIG. 3, similar numbers mean similar structures.

Structurally, prime mover 210 and prime mover 301 are in-line mounted engines of the type described above. Engine 210 drives pulley 212, which engages belt 214 to drive pulley 208 on drive shaft 204. Likewise, prime mover 301 drives pulley 303, which engages belt 305 to drive pulley 206.

Drive shaft 204 engages clutches 28, 46, as described above. Clutch 46 drives bevel gear 218, which drives ring gear 220. Ring gear 220 drives wide lift fan driving belt assembly 307. Wide driving belt assembly 307 comprises an upper wide drive belt, a differential drive to change the direction of shaft rotation on a lower wide drive belt. The upper wide drive belt engages starboard lift fan drive capstan 309. The lower wide drive belt, which counter-rotates in relation to the upper wide drive belt, drives port lift fan idler pulley assembly 311. This assembly is described in great detail below in connection with FIG. 4.

Starboard lift fan idler pulley 309 drives upper and lower lift fan belts 313, which engage the upper and lower drive pulley assembly 315, about the axis of starboard lift fan 317. Starboard lift fan 317 may be an eight or nine bladed fan.

In FIG. 3, starboard lift fan 317 is visible through a partially opened slotted vent mechanism 40, which overlies the lift fan in tandem wing 34 and is shaped such, that when closed, it forms an airfoil section with the remainder of decalage 34. This will be discussed in greater detail in connection with FIGS. 6, 7 and 8, below. Multiple-slotted vent arrangement 40 is shown having a medial lateral control arm 320. This control arm is adapted to engage each of the louvers of louver assembly 40, such that they may be simultaneously opened or closed. A similar louvered structure is adapted to the bottom of decalage 34, below lift fan assembly 317.

Port lift fan idler assembly 311 drives upper and lower port lift fan belts 322, which operably engage the upper and lower pulleys on port lift fan drive axis assembly 324. Lift fan 326 is mounted on lift fan axis 324. Louver assembly 328 is shown closed on the port lift fan assembly in FIG. 3.

FIG. 4 shows a partially cut-away view along lines 4—4, FIG. 3, illustrating the power transmission assembly from the bevel gears 218 and 220 through to the lift fans. Discussion of the details of the louver assembly of the lift fans has been deferred to FIGS. 6, 7 and 8 below, in the interests of clarity.

In FIG. 4, similar numbers mean similar structures.

Structurally, ring gear 220 drives shaft 401. Just below ring gear 220, upper wide belt power transmission pulley 403 engages upper drive belt 405. Just below pulley 403, a differential drive 407 reverses the direction of pulley rotation, such that lower wide belt pulley 409, which operably engages lower wide drive belt 411, is in counter-rotation to pulley 403.

Lower wide drive belt 411 engages medial pulley 413 of port lift fan assembly 311.

Idler pulley assembly 311 has a shaft 415, with driven pulley 413 medially disposed between upper lift fan driver pulley 417 and lower port lift fan driver pulley 419. Upper port lift fan driver 417 engages upper port fan drive belt 421 and lower lift fan belt driver pulley 419 engages lower lift fan drive belt 423. Port lift fan drive axis assembly 324 comprises a central shaft 425, upon which is rotationally mounted lift fan 326. Lift fan 326 is mounted medially on axis 425, between upper port lift fan drive pulley 427, which engages upper belt 421, and lower driven port lift fan pulley 429, which is driven by operably engaging lower drive belt 423.

Starboard idler lift fan power transferral assembly 309 comprises a central shaft 431, a starboard wide driven pulley 433, which operably engages upper wide starboard drive belt 405; and a bearing block 435 mounted medially between upper starboard drive belt pulley 437 and lower starboard drive belt pulley 439.

Upper starboard drive belt pulley 437 drives upper starboard lift fan drive belt 441, while lower starboard lift fan drive pulley 439 engages and drives lower starboard lift fan drive belt 443. Lift fan axis assembly 315 comprises a central shaft 455 rotationally engaging starboard lift fan 317. Starboard lift fan 317 is medially disposed between upper starboard lift fan drive belt driven pulley 447, which operably engages upper belt 441 and lower starboard lift fan driven pulley 449, which is driven by and operably engages lower belt 443.

Functionally, shaft 401 is the primary fan shaft and sprockets 409 and 403 are six inch (6") diameter, three inch (3") wide sprockets. These three inch (3") wide primary fan sprockets drive three inch (3") wide primary fan belts, which are H.T.D. belts capable of handling in excess of seventy-five (75) h.p. Secondary fan sprocket assemblies 309 and 311 are driven by these primary fan belts and, in turn, drive the secondary fan belts 441, 443, 421 and 423, which drive the lift fans. The reason for having two fan belts is to provide safety by means of a redundant drive system in the wing, where abrasion could cause fatigue or damage to the secondary driving belt. The secondary fan belts 441, 443, 421 and 423 are housed in protective sleeves, not shown, to protect them from wind vibration and possible jamming. Each belt is capable of handling a seventy-five (75) h.p. load, which will fully operate either of the lift fans. The lift fans themselves are eight (8) or nine (9) bladed, and turn in the neighborhood of 3500 r.p.m., to produce five hundred (500) pounds of vertical lift each.

It should be noticed that the two lift fans are driven in counter-rotation to cancel torque loads on the airframe, and their angular velocity is synchronized to prevent uneven load distribution occurring between the fans.

FIG. 5 illustrates a detail of the power transmission portion of the prime mover in the present invention, taken along section lines 5—5 of FIG. 3.

FIG. 6 is a cross-section taken along lines 6—6 of FIG. 3, illustrating lift fan wing 34 with slat assembly 40 opened, whereby lift fan 317 can provide direct lift by moving air from the top of the wing out the bottom of the wing.

Structurally, wing 34 is provided with lift fan opening 35, which is covered by a moving slatting system 40.

Figure 7:
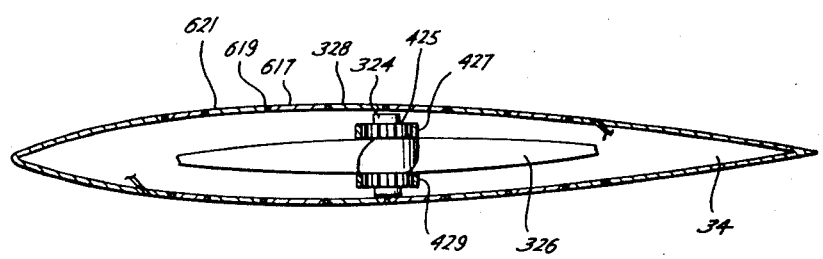
FIG. 7 is a cross-sectional view of the lift fan wing of the present invention, taken along Section line 7—7 of FIG. 3, and illustrating the louver structure of the lift fan wing of the present invention wherein the louvers form an airfoil.

Movable slatting system 40 comprises a medial longitudinal control member 607, which is attached at regular intervals to a plurality of joints 603 to a plurality of movable slats 601. Movable slat 601 is hinged at its upper point 603 to longitudinal control member 607. Each slat 601 is further pivoted about a joint at its lower end 605. The slats are chosen in width such that they overlap when control member 607 is fully engaged, as shown in FIG. 7 below. In the preferred embodiment of the present invention, the upper slats 601 are adapted such that the fixed pivot point 605 at the bottom of each of the slats is rearward, with respect to the motion of wing 34 from the top pivot point 603 of slat 601, when control member 607 is actuated.

The bottom of lift fan opening 35 is similarly enclosed by a series of movable slats 611, which have pivot points 613 on longitudinal control member 612 and second pivot point 615 inward toward the plane of fan 317. Slats 611 on the bottom of wing 34 are adapted such that pivot point 613 is always in line with or to the rear of pivot point 615.

FIG. 7 illustrates a view of lift fan wing 34, taken along line 7—7 of FIG. 3. FIG. 7 illustrates the way in which slatting system 40 provides an airfoil for wing 34, when the present invention is in its forward flight regime.

In FIG. 7 similar numbers indicate similar structures. Pivot point 619 is abutted on either side in flush mating engagement by slats 621 and 617. A similar series of slats flushly engages on the bottom of wing surface 34, to provide the bottom of the airfoil.

Figure 8:
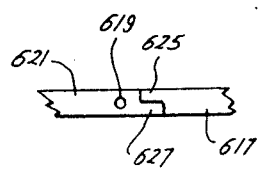
FIG. 8 is a section of FIG. 7, showing the means by which the aerodynamic integrity of the lift fan wing is maintained during forward flight.

FIG. 8 is a detailed view about pivot point 619 showing the mating engagement structure of slats 621 and 617.

In FIG. 8, slat 617 is shown as having an upwardly projecting partial engagement member 625. Slat 621 is shown as having a lower half butting engagement member 627 aft of pivot point 619.

Functionally, FIGS. 6, 7 and 8 illustrate the means by which the present invention directs the flow of air through the lift fan wing during takeoff and landing and provides forward and reverse thrust during transition from the present invention's forward flight regime to its hovering takeoff or landing regime. Control members 607 and 612 operate longitudinal slat control members 320 and 609, respectively. To open slat system 40 and its reciprocal lower slat system on the under side of the wing, so as to vector thrust from the lift fans either straight down or so as to provide a forward thrust vector to the present invention. Additionally, as the present invention transitions to or from its forward flight regime, the fact that the upper louvers open into the air stream while the lower louvers discharge into the air stream provides a ram effect to increase the efficiency of the lift fans during transition.

When the present invention is in its forward flight regime, the louver systems are locked closed and the fans are disengaged by the lift fan clutch.

The louvers of the two lift fans shown in the preferred embodiment of the present invention may be synchronized during transition to or from a forward flight regime, or they may be controlled individually to provide yawing movements about the center of gravity of the aircraft.

One other major operating component of the craft is that during the transition, to or from hover, the main wing and canard wing continue to provide lift by normal means even at slow speeds. That is to say, from hover as the craft moves forward in slow flight, the main wings and canard begin to lift the craft very early in forward flight. Also, as the craft slows from forward flight to hover, the main wings and canard continue their lifting function until the lift fans achieve vertical lift velocity. It is the combination of lifting fans and lifting wings that augment one another through their respective flight regimes, in this canard configuration aircraft.

Although the inventor has described a specific embodiment of the present invention in the specifications, that embodiment was given as a illustration only and should not limit the scope of the invention. Many modifications to the present invention, all of which are within its scope, will be obvious to those with skill in the art of aeronautical engineering. The present invention should, therefore, be limited only by the appended claims and their legal equivalent.

I claim:

1. A vertical and short take-off and landing aircraft comprising:
   a fuselage made of foamed core material;
   a set of canard wings attached to said fuselage forward of the center of gravity of said aircraft, said canard wings including elevator members pivotally attached thereto for controlling pitch of said aircraft;
   a second set of lift fan wings, having relatively thick cross-section, attached to said fuselage at about the center of gravity of said aircraft, each one of said second set of lift fan wings comprises:
      a generally circular duct extending vertically through said wing;
      a multi-bladed fan mounted for free rotation axially in said duct;
      prime mover means for selectively applying rotational torque to said fan, said prime mover means arranged so as to drive said fans in contrarotation to each other; said prime mover means comprising at least two engines driving a central shaft, said engines capable of producing in excess of one horsepower per pound of engine weight;
      means for selectively applying the rotation of the center shaft to the lift fans;
      second shaft transmission means for selectively applying rotation of said central shaft to a pusher propeller located aft of said lift wings; and
      fan control means for controlling the inflow and outflow of gas through said circular duct comprising:
         pivoted openable forward opening inlet control vanes in the duct inlet, the upper surface of said vanes being shaped so that they form an airfoil when the vanes are closed, the forward end of one of said vanes being adapted to be received in flush mating engagement with the rearward portion of an adjacent vane, said forward opening inlet control vanes for causing forward motion of said aircraft to produce a ram air effect in said duct;
         pivoted discharge vanes on the underside of said duct to direct the discharge of fluid through said duct; and
         at least one control arm connected to said vanes for causing the simultaneous movement of said vanes;
   a third set of relatively thin main lift wings attached to said fuselage aft of the center of gravity of said aircraft, said third set of lift wings including ailerons pivotally connected thereto; and
   orthogonal working surfaces arranged aft of said pusher propeller.

* * * * *